United States Patent [19]
Sakata et al.

[11] Patent Number: 5,182,748
[45] Date of Patent: Jan. 26, 1993

[54] PROTOCOL CONVERSION SYSTEM

[75] Inventors: Shigekazu Sakata, Saitama; Yasuo Ito, Tokyo; Kunio Ochiai; Hisao Yamagata, both of Kanagawa, all of Japan

[73] Assignee: Kokusai Denshin Denwa Co., Ltd., Tokyo, Japan

[21] Appl. No.: 599,786

[22] Filed: Oct. 18, 1990

[30] Foreign Application Priority Data

Oct. 20, 1989 [JP] Japan ................................. 1-271874

[51] Int. Cl.[5] .............................................. H04J 3/12
[52] U.S. Cl. .................................. 370/94.1; 370/60; 370/79
[58] Field of Search ........................... 370/94.1, 79, 60

[56] References Cited

U.S. PATENT DOCUMENTS

| | | | |
|---|---|---|---|
| 4,908,821 | 3/1990 | Sirato | 370/94.1 X |
| 4,947,388 | 8/1990 | Kuwahara et al. | 370/60 |
| 4,975,906 | 12/1990 | Takiyasu et al. | 370/94.1 X |
| 4,975,910 | 12/1990 | Onder | 370/94.1 |
| 5,086,426 | 2/1992 | Tsukakoshi et al. | 370/94.1 X |

OTHER PUBLICATIONS

"Interface Between Data Terminal Equipment (DTE) and Data Circuit-Terminating Equipment (DCE) for Terminals Operating in the Packet Mode and Accessing a Packet Switched Public Data Network Through a Public Switched Telephone Network or an Integrated Services Digital Network or a Circuit Switched Public Data Network", Fascicle VIII.2—Rec. X.32, (Malaga—Torremolinos, 1984, amended at Melbourne, 1988).

"Interface Between Data Terminal Equipment (DTE) and Data Circuit-Terminating Equipment (DCE) for Terminals Operating in the Packet Mode and Connected to Public Data Networks by Dedicated Circuit", Fascicle VIII.22—Rec. X.25, (Geneva, 1976; amended at Geneva, 1980, Malaga-Torremolinos, 1984 and Melbourne 1988).

Primary Examiner—Douglas W. Olms
Assistant Examiner—Russell W. Blum
Attorney, Agent, or Firm—Nikaido, Marmelstein, Murray & Oram

[57] ABSTRACT

An X.25 protocol apparatus can communicate with another X.25 apparatus or a X.32 apparatus through a telephone network, an ISDN network, or a PBX network, by attaching protocol conversion system to the X.25 apparatus. The conversion system has a pair of signal identification portions (1, 6) for separating a receive packet to a data packet and a control packet, a call process portion (3, 12) for dial signal process, and an address table (4) and a packet edition portion (5) for address conversion of a control packet. A data packet is forwarded from one signal identification portion to another signal identification portion through direct path (53). A control packet is forwarded to a control packet identification portion (2) for control process which includes dial signal process, address conversion, and protocol sequences. This system is applicable to couple a data communication network which has a X.32 correspondence portion to another data communication network.

4 Claims, 10 Drawing Sheets

| TBL NUMBER | DESTINATION ADDRESS | EXCHANGE CIRCUIT NUMBER | DCE·DTE SELECTION | NUI | NUI | NUI |
|---|---|---|---|---|---|---|
| MAX 5 FIGURES | MAX 20 FIGURES | MAX 27 FIGURES | 1 FIGURES | MAX 20 FIGURES | MAX 8 FIGURES | MAX 20 FIGURES |
| (a) | (b) | (c) | (d) | (e) | (f) | (g) |

| CONVERSION ADDRESS | SECURITY MODE SELECT | ADDRESS CONVERSION MODE SELECT |
|---|---|---|
| MAX 20 FIGURES | 1 FIGURES | 2 FIGURES |
| (h) | (i) | (j) |

PROTOCOL CONVERSION SYSTEM

BACKGROUND OF THE INVENTION

The present invention relates to a protocol conversion system between a subscriber terminal and a communication network, and/or between communication networks.

The X.25 protocol has been used for high speed data communication. However, X.25 protocol is not compatible with conventional telephone network, PBX, and ISDN (integrated service digital network). Therefore, the X.32 protocol has been developed for those purposes. However, the X.32 protocol needs specific equipment, and conventional X.25 equipment is not compatible with X.32 communication.

Figure 9:
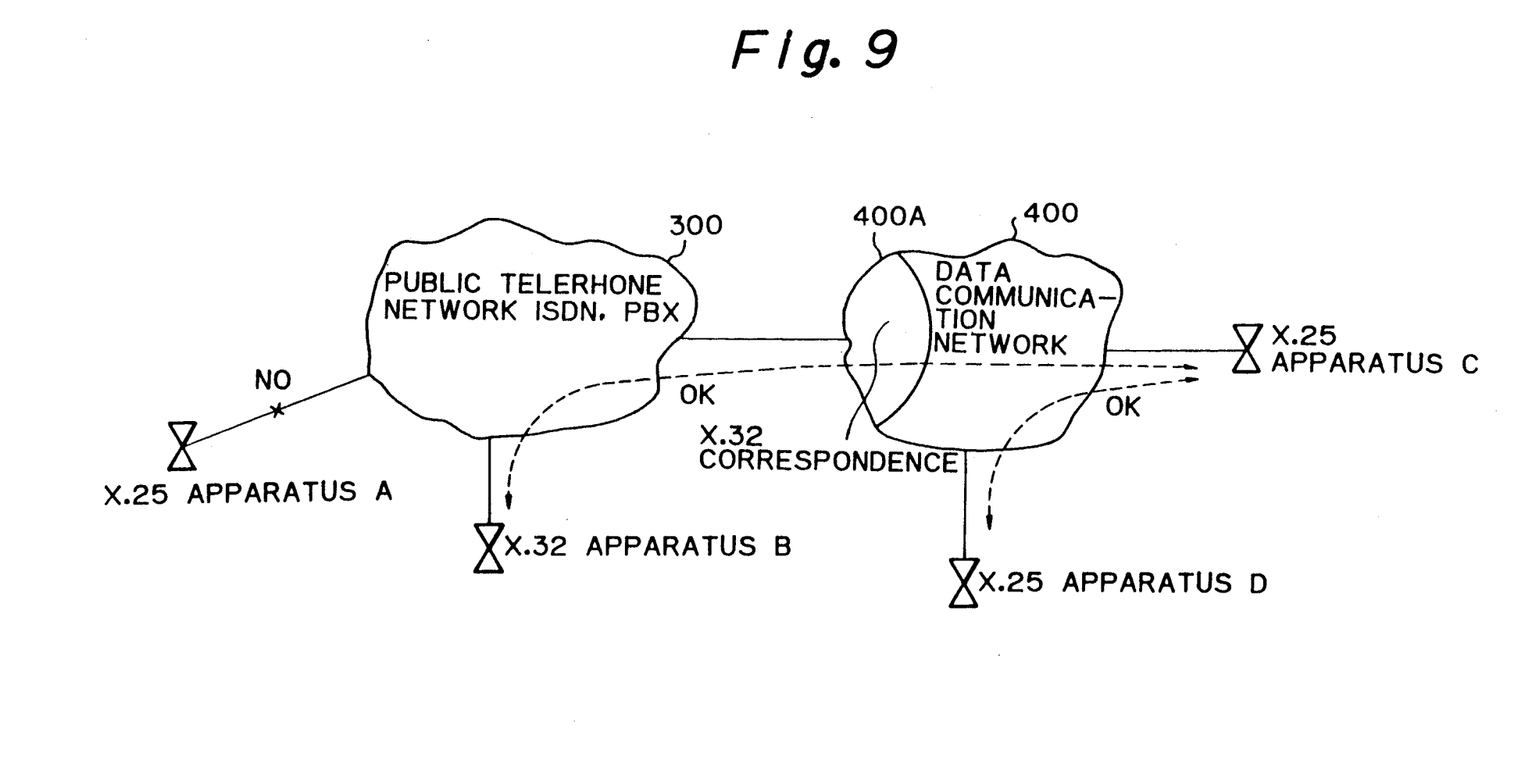
FIG. 9 shows a prior example of the use of a protocol in network coupling.

FIG. 9 shows a prior data communication network. In the figure, the X.25 apparatus C may communicate with another X.25 apparatus D through the data communication network 400. The data communication network 400 has the X.32 correspondence portion 400A for the communication with an X.32 apparatus. X.32 apparatus B which is coupled with a telephone network, ISDN or PBX 300 may communicate with another X.32 apparatus which is coupled with the telephone network 300, and also communicate with a X.25 apparatus C or D through the X.32 correspondence portion 400A and the data communication network 400.

However, a X.25 apparatus A cannot couple to the telephone network 300.

Further, in the X.25 protocol system, terminal equipment is coupled with a communication network through a subscriber's circuit for Packet Switched Public Data Network, and therefore, no data communication is possible by using a public telephone network, a PBX, and an ISDN circuit.

Further, if the protocol of the first network differs from that of the second network, the address system and the parameters of the first protocol differ from those of the second protocol, and no communication is possible between the first protocol and the second protocol.

Accordingly, it is preferable that an X.25 protocol apparatus may access to a data communication network through a public telephone network, PBX, and/or ISDN. And, it is desirable that X.25 protocol equipment may communicate with X.32 protocol equipment, and/or X.25 equipment may communicate with other X.25 equipment through a public telephone network. The address system and the parameters of a protocol must be converted for coupling different protocols.

SUMMARY OF THE INVENTION

It is an object, therefore, of the present invention to provide a protocol conversion system for a telecommunication system.

It is also an object of the present invention to provide an protocol conversion system for coupling a X.25 terminal apparatus with a conventional telephone network, an ISDN, or a PBX system.

It is also an object of the present invention to provide a protocol conversion system for coupling a data communication system with another data communication system.

The above and other objects are attained by a protocol conversion system coupled with an X.25 apparatus and one of networks including a telephone network, an ISDN network and a PBX network for allowing the X.25 apparatus to couple with another X.25 apparatus through one of the networks, comprising; a first signal identification portion (1) coupled with the X.25 apparatus, a second signal identification portion (6) coupled with one of said networks, a control packet identification portion (2) coupled between the signal identification portions (1, 6), a call process portion (3) coupled with the control packet identification portion (2) and the second signal identification portion (6), an address table (4) and a packet edition portion (5) coupled with the control packet identification portion (2) and said signal identification portions (1, 6), a common control (10) and a keypad (11) for common control and initialization of each of the elements, and a direct path (53) coupling the signal identification portions (1, 6), wherein each of the signal identification portions (1, 6) separates a receive packet to a data packet and a control packet, the former is forwarded to another signal identification portion (6, 1) through the direct path (53), and the latter is forwarded to the control packet identification portion (2). The call process portion (3) processes a dial signal for connection and disconnection, and the address table (4) and the packet edition portion process address conversion, of a control packet. A connect operation is carried out by control packets CR, CC, CN and CA between the present conversion system and the X.25 apparatus, and the packets for X.32 protocol between the present conversion system and one of said networks including address conversion of a packet. Data transfer is carried out by transferring a data packet through the direct path (53), and a disconnect operation is carried out by control packets CQ, CF, and CI between the X.25 apparatus and the present conversion system, and the packets for X.32 protocol between the present conversion system and one of the networks.

When one data communication network is coupled with another data communication network through the present conversion system, the conversion system has a second call process portion (12).

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
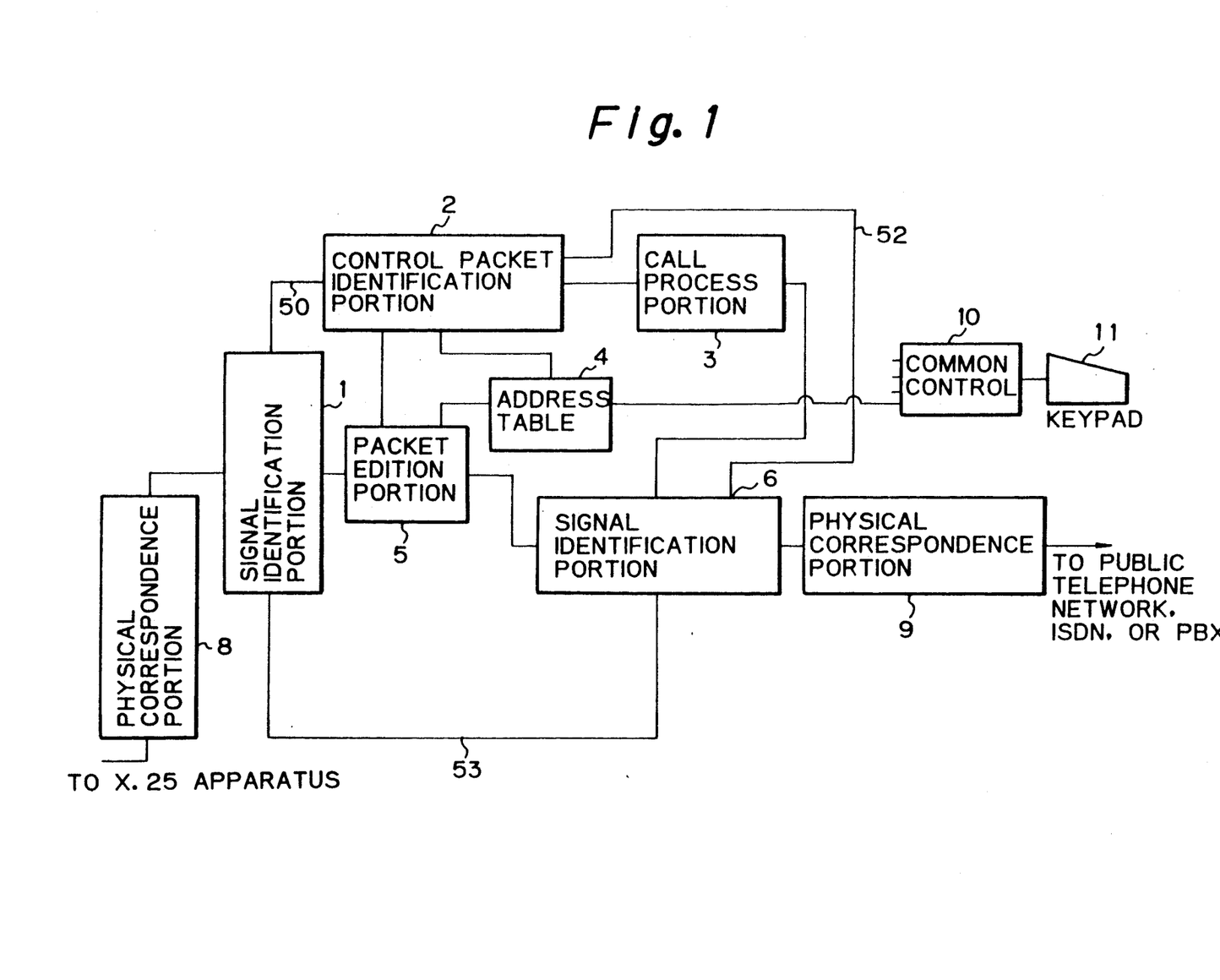
FIG. 1 is a block diagram of the protocol conversion system according to the present invention.

According to the present invention, an X.25 protocol terminal apparatus can communicate with an X.32 terminal apparatus, and/or an X.25 terminal apparatus through a conventional telephone network with no change of a terminal apparatus itself. Further, no change is necessary in a network side, since an address system and parameters are converted by the present conversion FIG. 1 shows a block diagram of the protocol conversion system for coupling an X.25 apparatus to a conventional telephone network, an ISDN system and/or a PBX system.

In the figure, the physical correspondence portions 8 and 9 are coupled with an X.25 apparatus, and a telephone network, respectively, and function the communication rate conversion, signal level conversion et al.

The signal identification portions 1 and 6 are connected to a X.25 apparatus, and a telephone network, respectively, through said physical correspondence portions 8 and 9, and function to switch a control packet and a data packet. A control packet is forwarded to a control packet identification portion 2 through a line 50 or 52. A data packet is forwarded to another signal identification portion through a line 53. The control packet identification portion 2 performs the address conversion of a packet by using an address table 4, and a packet edition portion 5, and control of some protocol sequences.

The call process portion 3 performs the dialing function to a telephone network including physical link monitoring.

The packet edition portion 5 effects to update the address in a DTE area and NUI area of a control packet according to the converted address by the control packet identification portion 2.

The modulo conversion is effected by the signal identification portion.

The K parameter conversion is effected by the signal identification portions 1 and 6.

The link level address conversion is effected by the signal identification portions 1 and 6.

The security function is effected by the packet edition portion 5 by arranging a password.

Embodiment 1

Figure 2:
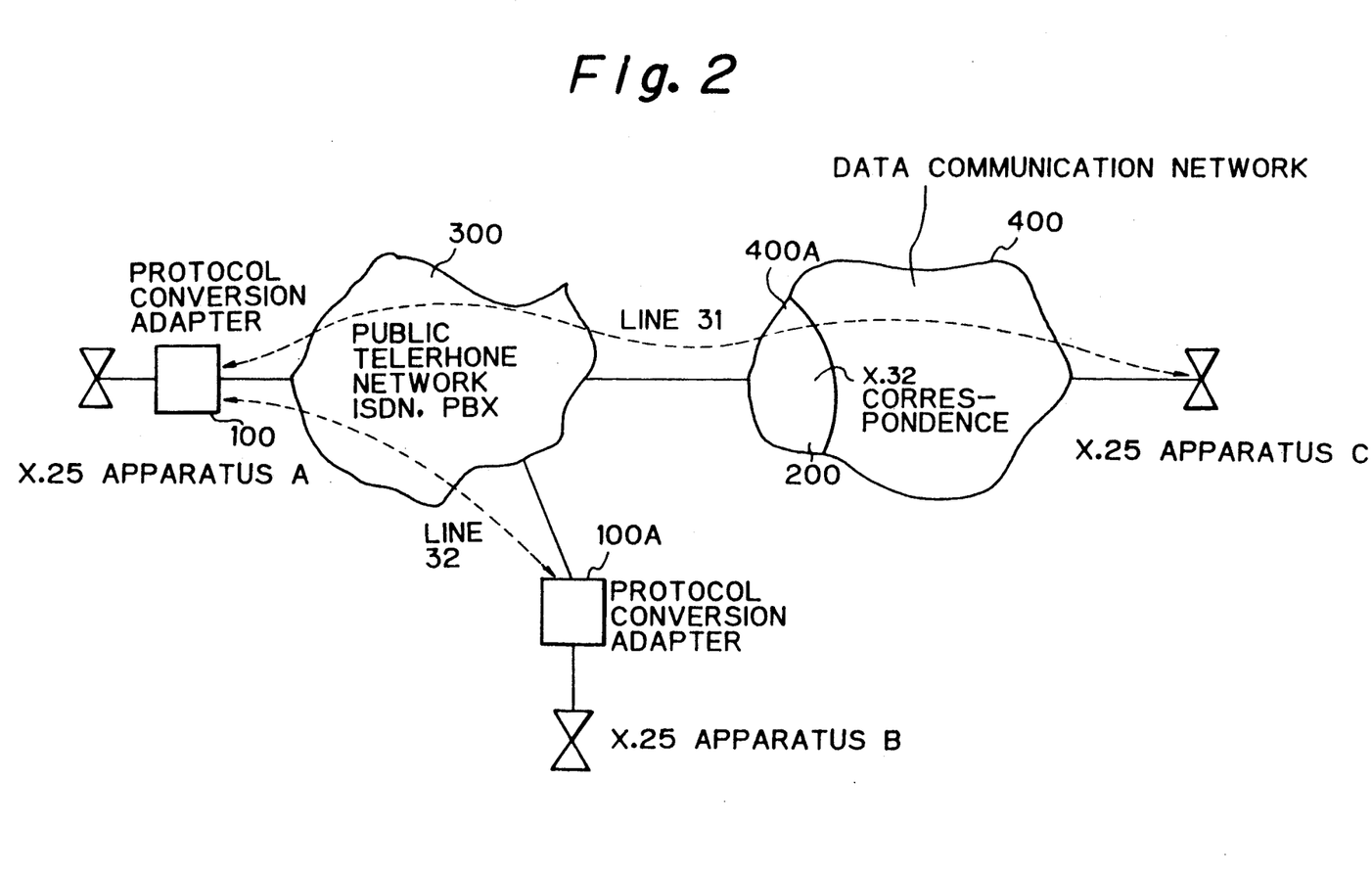
FIG. 2 shows an example of the practical use of the protocol conversion system of FIG. 1.

FIG. 2 shows an example of the practical use of the present invention.

The feature of FIG. 2 is the presence of the protocol conversion adapter 100 between an X.25 apparatus and a conventional telephone network, an ISDN system, or a PBX system.

The communication between the X.25 apparatus A and an X.32 system through a telephone network 300 and a line 31 is described in the first embodiment.

Figure 3:
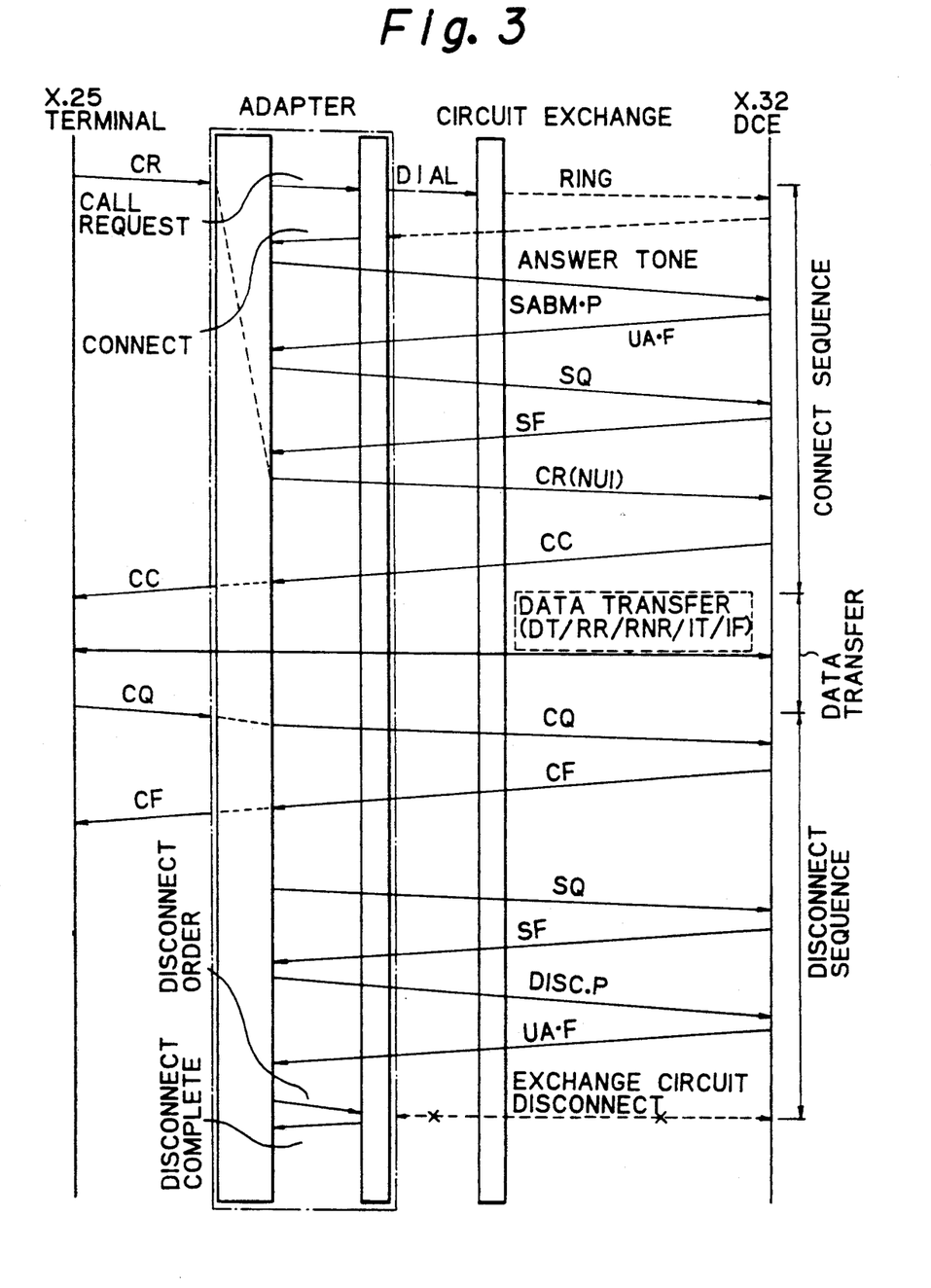
FIG. 3 shows a flow of an originate call process from a X.25 protocol apparatus in the first embodiment.
Figure 4:
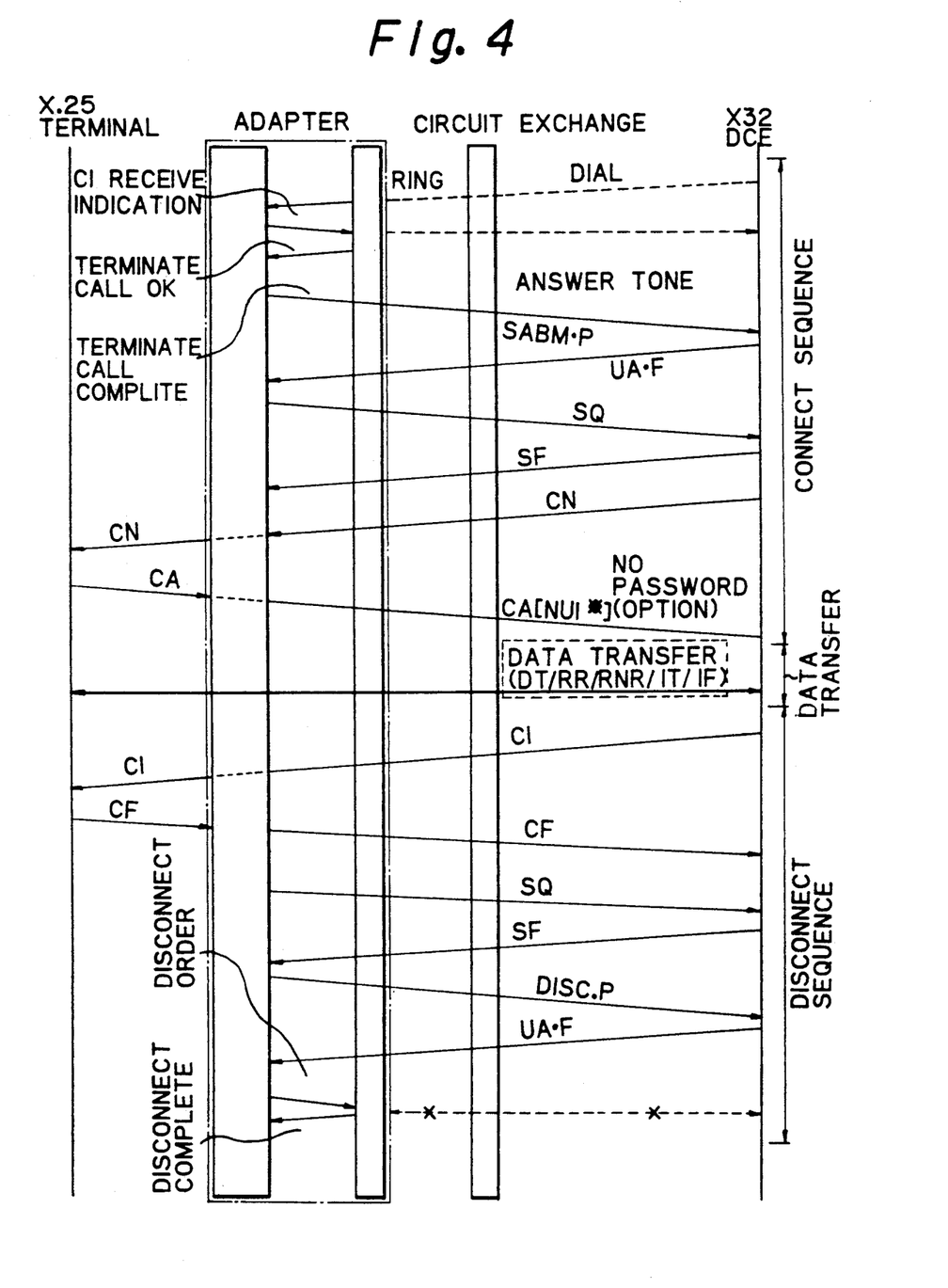
FIG. 4 shows a flow of a terminate call process from a network in the first embodiment.

The protocol sequence when a call is originated in the X.25 apparatus is shown in FIG. 3, and the protocol sequence when a terminate call reaches X.25 apparatus A is shown in FIG. 4.

First, the call originated by the X.25 apparatus A is described in accordance with FIG. 3.

The control packets related in the present invention are as follows.

A CR is a call request packet which requests a call.
SABM·P is a set asynchronous balanced mode packet
UA·F is an unnumbered acknowledge packet.

SQ is a reset request packet for initializing a packet number.

SF is a reset confirmation which is the response to the SQ packet.

It should be noted that the call request packet CR has an DTE area which includes a telephone number, and a NUI area which includes a network user identification and a password.

A CC is a call connected packet.

A CQ is a clear request packet which asks disconnect.

A CF is a clear confirmation packet which is the response to the CQ packet.

A DISC·P is a disconnect packet requesting a disconnect.

A CN is an incoming call packet, which is the same as the CR packet, but is recognized by the CN packet in a receive side.

A CA is a call accepted packet which is the response to the CN packet.

A data packet is supposed to include a data packet DT, a receive ready packet RR, a receive not ready packet RNR, an interrupt packet IT, and an interrupt confirmation packet IF.

When the call is originated in the X.25 apparatus, the physical correspondence portion 8 performs the physical interface of the X.25 apparatus A, and monitors the signal level of the receive signal to keep the connection status of physical level.

The signal identification portion 1 separates a data packet and a control packet. The latter is forwarded to the control packet identification portion 2, and the former is forwarded to the other signal identification portion 6.

Figure 10:
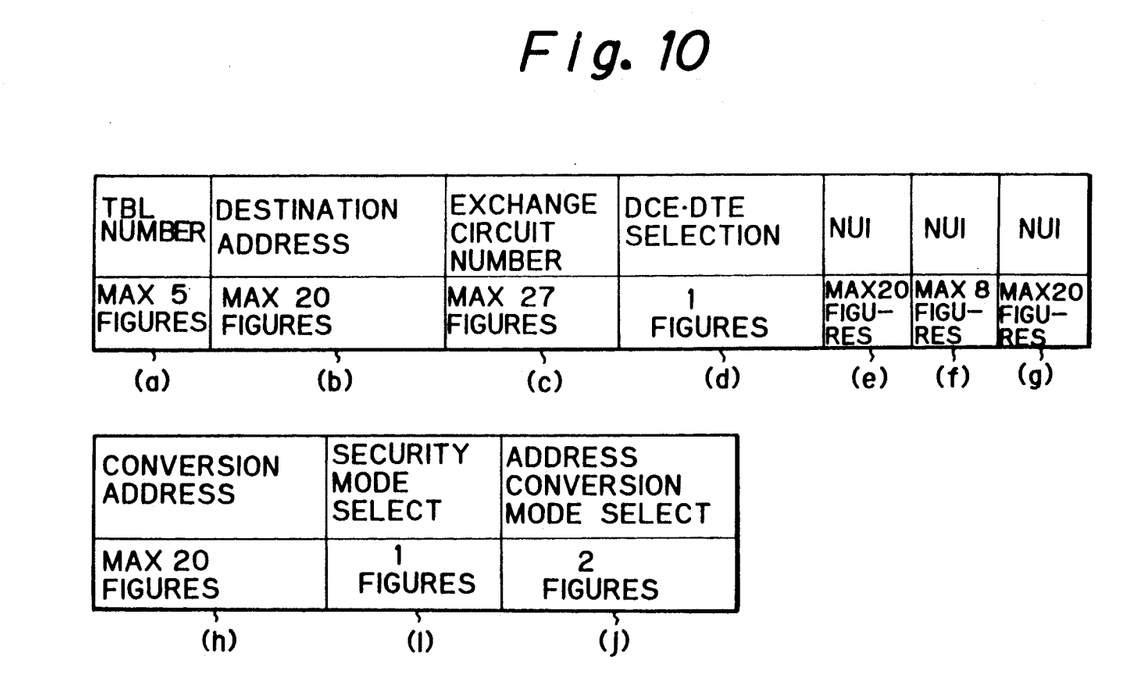
FIG. 10 shows an example of data structure of an address table.

When the control packet identification portion 2 finds a CR (call request) packet, the control packet identification portion 2 searches an address table 4 according to a destination address in the CR packet, and derives the dialing number, which is forwarded to the call process portion 3, to carry out a dial ringing. The data structure of the address table 4 is shown in FIG. 10.

The call process portion 3 carries out the dial control through the signal identification portion 3 for the circuit connection in the telephone network. The connection control after dialing is carried out by the signal identification portion 6, and the control packet identification portion 2. The physical correspondence portion 9 sends the dial number to the telephone network. When the physical level connection is completed with the data network, the connect signal is returned (see FIG. 3) to the signal identification portion from the network. Upon completion of the physical connection, the signal identification portion 6 carries out the connection with the data network which has the X.32 protocol correspondence portion through a telephone network at the link level (transmit of SABM·P, and receive of the response UA·F), and then, carries out the initialization of a packet number (transmit of an SQ packet and receive of an SF packet).

The packet edition portion 5 looks at the address table 4 according to the call-called DTE address in the CR packet, and provides the address which is used in the network, and updates the DTE address in the CR packet to the converted address. The packet edition portion also sets the NUI (user identification number, password et al) in the CR packet for the security purposes.

The CR packet thus converted is forwarded to the network through the signal identification portion 6 and the physical correspondence portion 9.

When the connection in the network is completed, the CC packet returns from the network, and the signal identification portion recognizes the complete connection upon receipt of the CC packet. The CC packet is transferred to the packet edition portion 5.

The packet edition portion 5 converts the address by referring to the address table 4 to the address system of the X.25 protocol apparatus, and then, the CC packet is transferred to the signal identification portion 1, which forwards the CC packet to the X.25 apparatus through the physical correspondence portion 8. Thus, all the connection operation finishes. The data packets sent from the X.25 apparatus are transferred to the network through the signal identification portion 1, the line 53, the other signal identification portion 6, and the physical correspondence portion 9. The data packets include a DT, a RR, a RNR, an IT and an IF.

The disconnect sequence is described below.

When the signal identification portion 1 recognizes the CQ packet from the X.25 apparatus, that CQ packet is forwarded to the packet edition portion 5 through the control packet identification portion 2. The packet edition portion 5 carries out the address conversion. The CQ packet is then forwarded to the network through the signal identification portion 6. The CQ packet indicates the disconnect of a circuit. The CF packet returns from the network as the response to the CQ packet, and the CF packet is recognized by the signal identification portion 6 through the physical correspondence portion 9, and is given to the control packet identification portion 2. The control packet identification portion 2 gives the CF packet to the packet edition portion 5, and sends the CF packet by setting the address of the X.25 apparatus to the X.25 apparatus. When another communication using the even physical line is busy, no disconnect sequence of a physical line is carried out, and the telephone circuit is kept. When another communication using the same line is not busy, the disconnect sequence is carried out.

The control packet identification portion 2 instructs the signal identification portion 6 the initialization of a packet level, and the disconnect of a link level. The signal identification portion 6 sends the SQ packet to the telephone network, and receives the returned SF packet. Then, the signal identification portion 6 sends the DISC·P to the telephone network, and receives the returned UA·F. The signal correspondence portion 6, upon receipt of the UA·F, advises the receipt of the same to the control packet identification portion 2, which asks the call process portion 3 the disconnect, and the call process portion 3 disconnects the circuit in the network. Thus, the all the sequences of the disconnect operation finish.

Next, the terminating call from a network to a X.25 apparatus is described in accordance with FIG. 4.

As for the terminating call from a network, when the physical correspondence portion 9 recognizes a terminating call signal CI, that signal CI is informed to the control packet identification portion 2 through the signal identification portion 6, and the call process portion 3. The control packet identification portion 6 instructs to call process portion 3 the connect, and the physical level connection is carried out by the terminating response by the physical correspondence portion 9 through the signal identification portion 6. Upon completion of the physical level connection, the signal identification portion 6 sends SABM·P to the network through the physical correspondence portion 9 for the link level connection, and waits for the UA·F from that circuit. Upon receipt of the UA·F, the SQ packet is forwarded to the network through the physical correspondence portion 9 for the initialization of a packet, and waits for the SF packet from the network. Upon receipt of the SF packet, the initialization at the packet level is completed. Upon completion of those connection control, the signal identification portion 6 waits for the CN packet from that circuit.

When the control packet identification portion 2 recognizes the CN packet through the signal identification portion 6, the related address table is looked at with the call-called address, and when the table exists, that CN packet is transferred to the packet edition portion 5, which updates the DTE address in the CN packet by looking at the address table according to the call-called DTE address of the CN packet, and deletes the NUI in the CN packet. When no related address table exists, or when the related address table exists but with wrong NUI, the terminating call is recognized as an unnecessary call, the disconnect is instructed to the signal identification portion 6 which effects the initialization of a packet and the link level disconnect, together with the instruction to disconnect to the call process portion 3, and the instruction to disconnect to the physical correspondence portion 9 through the signal identification portion 6.

The CN packet is transferred from the packet edition portion 5 to the signal identification portion 1, which transfers the CN packet to the X.25 terminal apparatus through the physical correspondence portion 8, and waits for the connect complete advice (CA packet) from the X.25 terminal apparatus.

Then, the CA packet which is the connect complete advice is processed similar to a CR packet for address conversion and NUI, and that CA packet is transferred to the network. Preferably, an NUI includes only an user identification, but does not include a password for the purpose of security in case of error connection.

A data packet from a network is transferred to the signal identification portion 1 upon recognition by the signal identification portion 1, and is transferred to the X.25 terminal apparatus through the physical correspondence portion 8.

When the signal identification portion 6 recognizes the CI (disconnect) packet from the telephone network, the packet edition portion 5 carries out the address conversion through the control identification portion 2 and the packet edition portion 5, and outputs to the signal identification portion 1 to forward the CI packet to the X.25 protocol apparatus. The returned CF packet from the X.25 protocol apparatus, is recognized by the signal identification portion 1 through the physical correspondence portion 9, and is given to the control packet identification portion 2, which transfers the CF packet to the packet edition portion 5. The CF packet is transferred to the telephone network after setting the address through the signal identification portion 6 and the physical correspondence portion 9.

When another logical channel is busy, no disconnect sequence including the packet level initialization is carried out, and the telephone circuit is kept. When another logical channel is not busy, the disconnect sequence is carried out. The control packet identification portion 2 instructs the signal identification portion 6 the initialization of a packet and the link level disconnect in a predetermined time. The signal identification portion 6 sends the SQ packet to the telephone network through physical correspondence portion 9, and receives the returned SF packet. The signal identification portion, upon receipt of the SF packet, sends DISC·P to the telephone network through the physical correspondence portion 9, and receives the returned UA·F. The signal identification portion 6, upon receipt of the UA·F, advises the control packet identification portion of the receipt. The control packet identification portion 2 asks the call process portion 3 to disconnect, and the call process portion 3 effects the disconnect of the telephone network.

The keypad 11 and the common control 10 function to keep the data maintenance of the address table, and the control data in each portion.

The change of the transmission rate in the physical correspondence portions 8 and 9 is carried out by the common control 10 by updating the parameters in the physical correspondence portions 8 and 9 according to the data input from the keypad 11. Similarly, mudulo, K parameter, and/or link level address are converted. The signal identification portions 1 and 6 process a receive packet and a transmit the packet by using the converted values.

As the signal identification portions 1 and 6 function to detect a particular data packet, the conversion of a data packet is carried out easily. The data packet traveling between the signal identification portion 1 and the other signal identification portion 6 is transferred through the control packet identification portion 2 and the packet edition portion 5. This structure allows the specific edition on a packet level.

It should be noted in FIGS. 3 and 4 that an X.25 apparatus handles only the control packets CR, CC, CQ, CF, CN, CA, and CI. Other control packets, and dialing operations are handled in the adapter 100.

Embodiment 2

Figure 5:
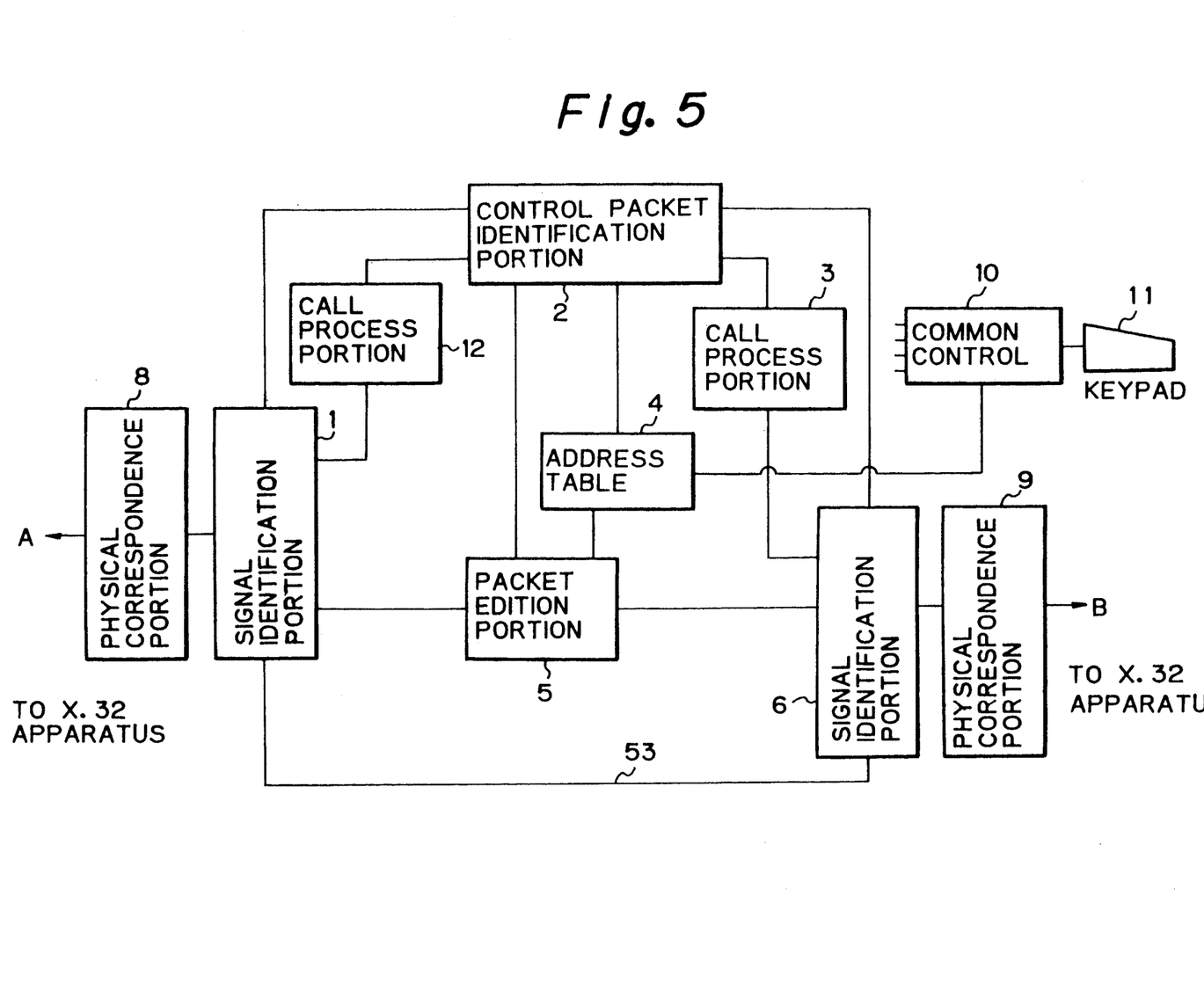
FIG. 5 is a block diagram of a network coupling apparatus for a X.32 protocol network.
Figure 6:
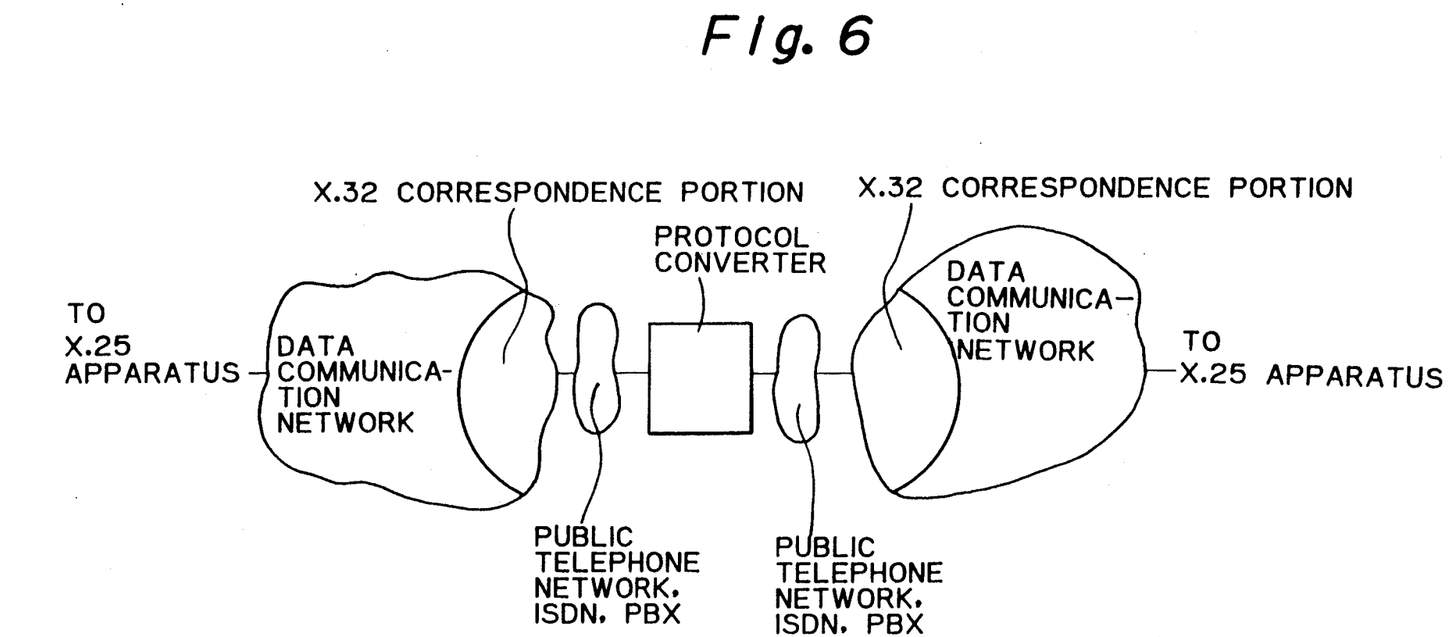
FIG. 6 shows the example of the practical use of the protocol conversion apparatus in the second embodiment.
Figure 7:
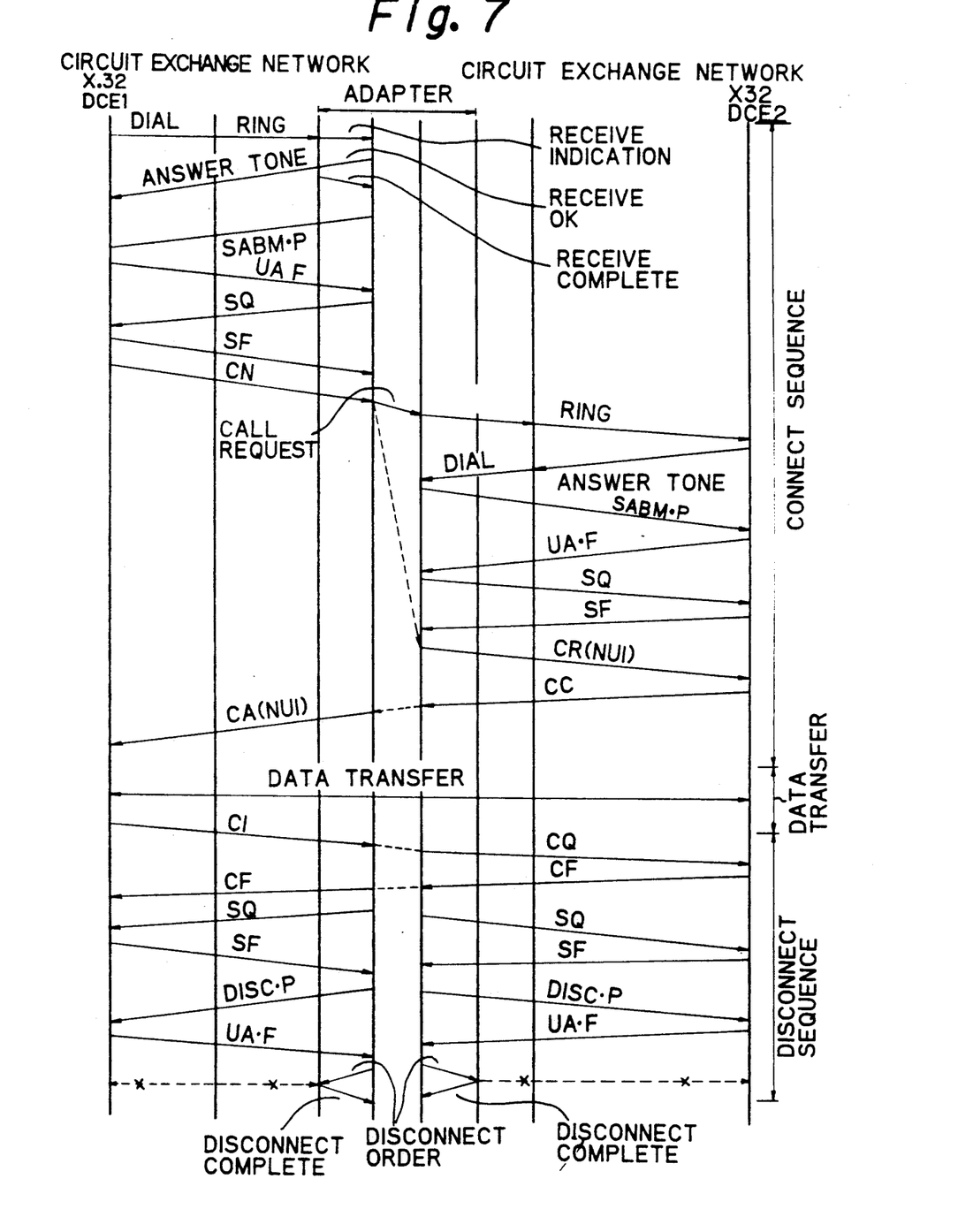
FIG. 7 shows a flow of an originate call using a X.32 protocol.

The second embodiment is described in accordance with FIGS. 5, 6 and 7, in which the present protocol converter connects a pair of data networks through a telephone network, an ISDN, or a PBX. FIG. 5 is a block diagram of the second embodiment, FIG. 6 is a schematic diagram of a network, and FIG. 7 shows a protocol sequence.

The feature of FIG. 6 as compared with FIG. 2 is that an X.32 protocol network is connected to a telephone network in series. The call process to a telephone network, and the terminate process from a telephone network in FIG. 6 are the same as those in the first embodiment. In FIG. 5, the call process portion 12 inserted between the signal identification portion 1 and the control identification portion 2 is the same as the call process portion 3, and the physical correspondence portion 9 is the same as the physical correspondence portion 8.

In FIG. 5, it should be noted that the keypad 11, the common control 10, the control packet identification portion 2, the address table 4, and the packet edition portion 5 are common to both the external circuits portion (X.32 circuit, eq. without packet switched Public Data Network). A pair of call process portions 3, 12, a pair of signal identification portions 1, 6, and a pair of physical correspondence portions 8, 9 are provided symmetrically to the common members.

When there is a terminate call at the left side of FIG. 5, the physical correspondence portion 8 detects the terminate call, and the terminate call signal CI is forwarded to the control packet identification portion 2 through the signal identification portion 1 and the call process portion 12. The control packet identification portion 2 provides the call process portion 12 with the connect instruction, carries out the terminate response in the physical correspondence portion 8 through the signal identification portion 1, and completes the physical level connection. Upon completion of the physical connection, the signal identification portion 1 forwards the SABM·P to the external circuit A through the physical correspondence portion 8 for the link level connection, and waits for the UA·F from said circuit A. Upon receipt of UA·F, the SQ packet is forwarded to the external circuit A through the physical correspondence portion 9 for the packet level initialization, and waits for the SF packet from the circuit. Upon receipt of the SF packet, the packet level initialization is completed. Upon completion of the connection control, the signal identification portion 1 waits for the CN packet from the external circuit A.

The signal identification portion 1 recognizes the receive CN packet as a CR packet, and transfers the same to the control packet identification portion 2. When the portion 2 recognizes the CR packet, the address table is searched based upon the called address, and when there the table exists, the CR packet is sent to the packet edition portion 5. The portion 5 searches the address table based upon the call-called DTE address in the CR packet to convert the address to that of the second external circuit, and then, the DTE address in the CR packet is updated, and the NUI in the CR packet is changed to that used in the second external circuit B.

When there is no address table related to the CR packet recognized by the control packet identification portion 2, or when the NUI differs, the terminate call is recognized as an unnecessary call, and the disconnect instruction is given to the signal identification portion 1 so that the packet level initialization, and the link level disconnect are carried out, the disconnect instruction is sent to the call process portion 12, which instructs the physical correspondence portion 8 to circuit disconnect through the signal identification portion 1.

When the receive CR packet is correct, the control packet identification portion 2 searches the address table based upon the called address in the packet, derives the dial number, which is transferred to the call process portion 3 for the call instruction. The data structure of the address table is shown in FIG. 10.

The call process portion 3 triggers the second external circuit B through the signal identification portion 6 and the physical correspondence portion 9. The physical correspondence portion 9 forwards the dial number which the call process portion 3 sent to the second external circuit B, and when the physical level connection to the X.32 protocol data network through the second external circuit is completed, the result of the connection is informed to the signal identification portion 6. Upon completion of the connection, the signal identification portion 6 carries out the link level connection (transmit of SABM·P and receive of the related UA·F) with the data network which has the X.32 protocol correspondence portion through a telephone network, and then, carries out the packet level initialization (transmit of SQ packet and receive of related SF packet) with said data network.

Upon completion of the packet level initialization, the control packet identification portion 2 forwards the CR packet which has been edited in the packet edition portion 5 to the signal identification portion 6, and sends the same to the second external circuit through the physical correspondence portion 9.

Upon completion of the connection in the data network, the CC packet returns from the second external circuit B, which informs the signal identification portion 6 the completion of all the connection procedure, then, the CC packet is given to the control packet identification portion 2. The control packet identification portion 2 recognizes the CC packet as a CA packet, and gives the CA packet to the packet edition portion 5.

The packet edition portion 5 converts the address by searching the address table to the first external circuit address, and the converted CA packet is given to the signal identification portion 1.

The signal identification portion 1 forwards the CC packet to the first external circuit through the physical correspondence portion 8, and then, the connection operation finishes. A data packet after the connection from the first external circuit A is transferred to the second external circuit B through the signal identification portion 1, the line 53, the signal identification portion 6 and the physical correspondence portion 9.

When the signal identification portion 1 recognizes the disconnect packet (CI) from the first external circuit A, that CI packet is forwarded to the packet edition portion 5, which effects the address conversion, and forwards the same to the signal identification portion, and the CQ packet is forwarded to a telephone network B. As the CF packet returns from the second external circuit B, that CF packet is recognized in the signal identification portion 6 through the physical correspondence portion 9, and that CF packet is sent to the control packet identification portion 2. The control packet identification portion 2 forwards the CF packet to the packet edition portion 5, which sets the address and forwards the CF packet to the first external circuit A through the signal identification portion 1, and the physical correspondence portion 8. When another logical channel is busy, no disconnect sequence including packet level initialization is carried out, and the circuit in a telephone network is kept. When another logical channel is not busy, the disconnect sequence is carried out. The packet identification portion 2 instructs the signal identification portions 1 and 6, the packet level initialization and the link level disconnect in a predetermined time. The signal identification portions 1 and 6 forward the SQ packet to the telephone networks A and B through the physical correspondence portions 8 and 9, and receives the returned SF packet. Upon receipt of the SF packet, the signal identification portions 1 and 6 forward the DISC·P to the telephone networks A and B through the physical correspondence portions 8 and 9, and waits for the return UA·F. Upon receipt of UA·F, the signal identification portions 1 and 6 advise the control packet identification portion 2 the fact of the receipt. The control packet identification portion 2 asks the call process portions 3 and 12 to disconnect, and the call process portions 3 and 12 instruct the physical correspondence portions 8 and 9 through the signal identification portions 1 and 6 to disconnect the first external circuit A and the second external circuit B.

As for the terminate call from the second external circuit B, the operation is similar to that from the first external circuit A.

The keypad 11 and the common control 10 carry out the data maintenance of the address table, together with the maintenance of all the other control data in all the other portions.

The communication rate in the physical correspondence portions 8 and 9 is adjusted by updating the parameters in the physical correspondence portions 8 and 9 by the common control 10 based upon the instruction input from the keypad 11. The modulo, the K parameter, and the link level address are also adjustable, and the signal identification portions 1 and 6 check a receive packet and sets a transmit packet with the updated values. As the signal identification portions 1 and 6 can detect the specific data packet, the conversion of a data packet is carried out easily. The data packet between the signal identification portions 1, 6 and the signal identification portions 6,1 is effected through the control packet identification portion 2 and the packet edition portion 5. This structure allows the specific edition on a packet level.

Embodiment 3

Figure 8:
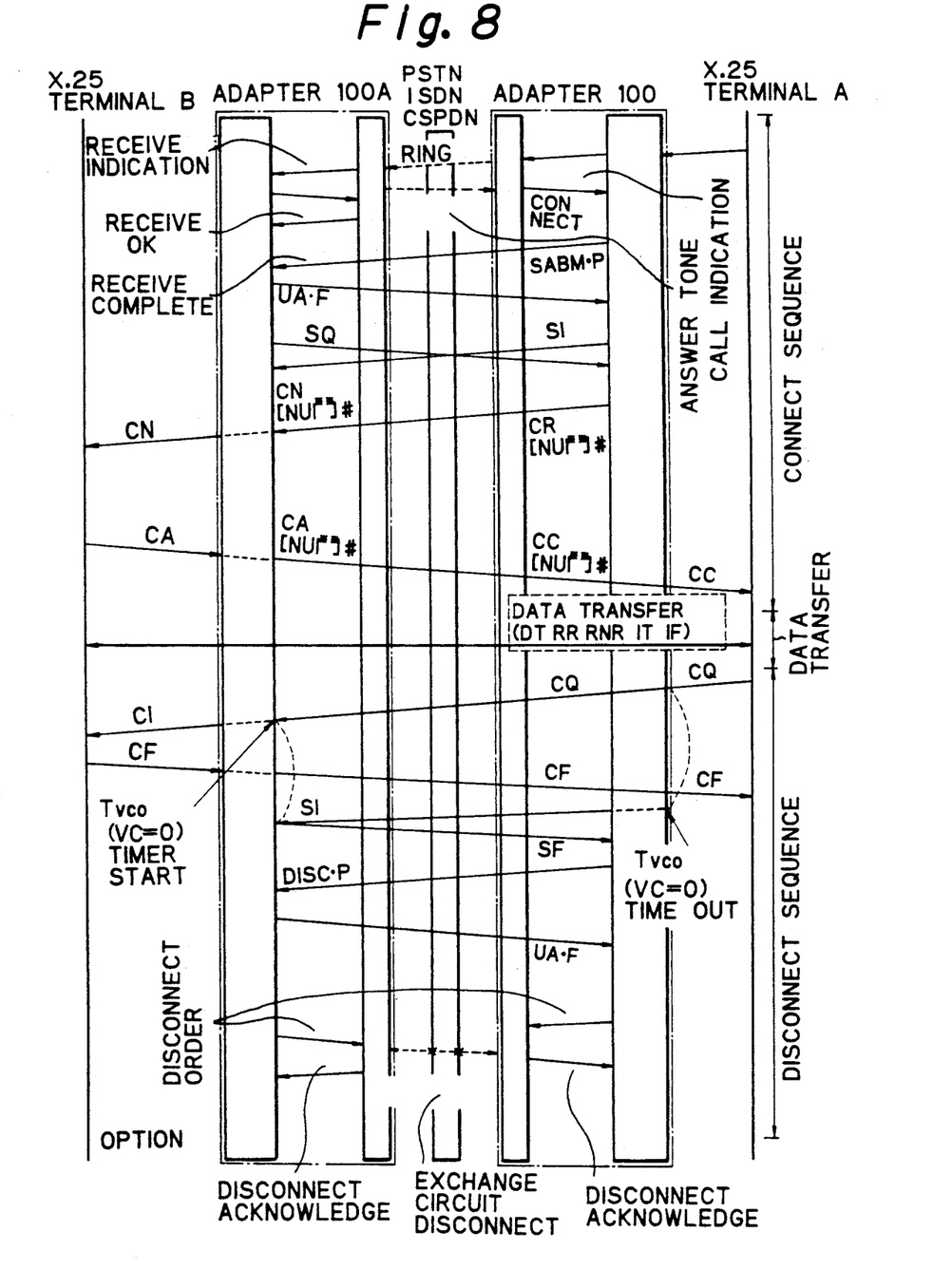
FIG. 8 shows a flow of a call in which X.25 protocol apparatuses are coupled through an adapter.

Now, the communication between a pair of X.25 apparatuses A and B (see FIG. 2) through the line 32 is described. The protocol sequence in this case is shown in FIG. 8.

In this case, it is supposed that the physical level connection and the link level connection between the X.25 apparatus and the signal identification portion 1 are always kept.

It is assumed that the X.25 apparatus A originates a call addressed to the X.25 apparatus B by sending a CR packet having the DTE of the apparatus B to the conversion adapter 100. That CR packet is recognized by the control packet identification portion 2 through the physical correspondence portion 8 and the signal identification portion 1. If no address table is found for that DTE address, the signal identification portion 1 sends the CI packet to the X.25 apparatus, and disregards the call request. When the address table relating to the DTE address in the CR packet exists in the address table 4, the telephone number (or ISDN number), the DTE address conversion process mode selection, DCE, DTE selection, and NUI are forwarded to the packet edition portion 5, and the call-called DTE address and the NUI are set in the CR packet.

The control packet identification portion 2 sends the dial number of the address table to the call process portion 3 to instruct the circuit connection. The call process portion 3 sends the dial number to the telephone network.

In the conversion adapter 100A in a receive side, the physical correspondence portion 9 makes a response and sends the receive call (CI) to the signal identification portion 6, which sends the receive call to the control packet identification portion 2 through the call process portion 3. The control packet identification portion 2 instructs the call process portion 3 the connect instruction, and informs the physical correspondence portion 9 through the signal identification portion 6. The physical correspondence portion 9 carries out the connection to the telephone network, and then, the physical level connection between the physical correspondence portion 9 of the adapter 100 is completed.

Then, the signal identification portion 6 of the adapter 100 and the signal identification portion 6 of the adapter 100A carry out the link level connection (exchange of SABM·P and UA·F), and the packet level initialization (exchange of SQ and SI).

Next, the control packet identification portion 2 of the adapter 100 sends the CR packet which is edited in the packet edition portion to the adapter 100A.

The adapter 100A receives that CR packet as the CN packet in the control packet identification portion 2. The address table is searched according to the call-called DTE address and NUI, and when the related table exists and the NUI coincides, the CN packet is recognized to be valid. Otherwise, the CN packet is recognized invalid, and the circuit disconnect is instructed to the signal identification portion 6, and the packet level initialization (transmit of SI and receive of SF), and the link level disconnect (transmit of DISC·P and receive of US·F) are carried out. The signal identification portion 2 informs the control packet identification portion 2 of the link level disconnect completion, and the control packet identification portion 2 instructs the call process portion 3 to circuit disconnect, and the call process portion 3 carries out the disconnect of the telephone circuit through the signal identification portion 6 and the physical correspondence portion 9.

When the CN packet is valid, the CN packet is edited by setting the call-called DTE address, and deleting the NUI, and the edited CN packet is forwarded to the adapter 100A, which repeats the same to the X.25 apparatus B. The X.25 apparatus B returns, then, the CA packet to the adapter 100A, which receives the same in the control packet identification portion 2 through the signal identification portion 1, effects the address conversion and the set of NUI according to the address table 4, and sends the CA packet to the telephone network through the signal identification portion 6 and the physical correspondence portion 9.

That CA packet is recognized as the CC packet in the adapter 100 in the control packet identification portion 2, which searches the address table according to the call-called DTE address and NUI in the CC packet to compare the NUI. When the comparison is unsuccessful, the packet level initialization, the link level disconnect, and the disconnect of the telephone circuit are carried out. When the comparison is successful, the address information is sent to the packet edition portion 5, so that the conversion of the call-called DTE address and the deletion of NUI are carried out, and the edited packet is sent to the X.25 apparatus A through the signal identification portion 1 and the physical correspondence portion 8.

The X.25 apparatus A, upon receipt of the CC packet, sends a data packet (DT), which forwards that data packet to the telephone network through the physical correspondence portion 8, the signal identification portion 1, the line 53, the signal identification portion and the physical correspondence portion 9. Similarly, the data packet is processed in the adapter 100A, and sent to the X.25 apparatus B.

When the communication finishes, the adapter 100 receives the CQ packet from the X.25 apparatus B. That CQ packet is recognized in the control packet identification portion 2 in the adapter 100, and the packet edition portion 5 carries out the packet edition for the address conversion and forwards the edited packet to the telephone network. That CQ packet is received by the adapter 100A as the CI packet. The packet edition portion of the adapter 100A carries out the address conversion, and the edited CI packet is sent to the X.25 apparatus B, which returns the CF packet. The CF packet is, then, upon address conversion, sent to the telephone network. The CF packet is sent to the X.25 apparatus A through the adapter 100 which effects the necessary address conversion in the packet edition portion 5.

The adapter 100, upon receipt of the CQ packet from the X.25 apparatus A, starts the timer TVC0 (not shown) in the control packet identification portion 2, and when that time reaches full or timeout, the signal identification portion 6 carries out the packet level initialization (transmit of a SI packet and receive of a SF packet), and the link level disconnect (transmit of a DISC·P and receive of a UA·F). Then, the completion of the link level disconnect is informed to the call process portion 3 through the signal identification portion 2 and the control packet identification portion 2, and the call process portion 3 carries out the disconnect of a telephone line.

The adapter 100A, upon receipt of the CQ packet from the adapter 100, starts the timer TVC0 (not shown) in the control packet identification portion 2. If a CR packet or a CN packet does not reach until the timer reaches full or timeout, the signal identification portion 6 carries out the packet level identification and the link level disconnect. Next, the call process portion 3 carries out the disconnect of the telephone line.

Embodiment 4

As a modification of the above three embodiments, if an X.25 apparatus or an X.32 apparatus has no function to transmit a CQ packet (disconnect of a circuit), the function of the CQ packet is carried out by modifying a DT (data) packet. In that case, the signal identification portion 2 forwards the modified DT packet to the control packet identification portion 2, which instructs the disconnect of a circuit upon receipt of the modified DT packet, as if it received a CQ packet. In that case, it is supposed that the common control 10 can set the packet format of the modified DT packet.

FIG. 10 shows the data structure of the address table 4 in FIG. 1 and FIG. 5.

The address table has the table number area up to 5 digits, the destination address area (or own address area) up to 20 digits, the exchange circuit number area up to 27 figures, the DCE/DTE selection area of 1 figure, the NUI area up to 20 figures, the second NUI area up to 8 figures, the third NUI area up to 20 figures, the destination conversion address area (or own conversion address area) up to 20 figures, the security mode selection area of 1 figure, and the address conversion mode select area of 2 figures.

As described above, according to the present invention, a conventional X.25 apparatus can function similar to an X.32 system with no change of an X.25 apparatus merely by attaching a protocol converter adapter to a X.25 apparatus. Further, as for X.32 data communication network, it is possible to connect the data networks through conventional telephone lines.

From the foregoing, it will now be apparent that a new and improved protocol conversion system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A protocol conversion system (FIGS. 1, 2, 3, 4 and 8) coupled with an X.25 apparatus and one of networks including a telephone network, an ISDN network and a PBX network for allowing said X.25 apparatus to couple with another X.25 apparatus through one of said networks, comprising;
- a first signal identification portion (1) coupled with said X.25 apparatus,
- a second signal identification portion (6) coupled with one of said networks,
- a control packet identification portion (2) coupled between said signal identification portions (1, 6),
- a call process portion (3) coupled with said control packet identification portion (2) and said second signal identification portion (6),
- an address table (4) and a packet edition portion (5) coupled with said control packet identification portion (2) and said signal identification portions (1, 6),
- a common control (10) and a keypad (11) for common control and initialization of each of said elements, and
- a direct path (53) coupling said signal identification portions (1, 6), wherein
- each of said signal identification portions (1, 6) separates received packets into data packets and control packets, said data packets being forwarded to another signal identification portion (6, 1) through said direct path (53), and said control packets being forwarded to said control packet identification portion (2),
- said call process portion (3) processes a dial signal for connection and disconnection, and
- said address table (4) and said packet edition portion process address conversion of a control packet, and wherein
- connection operation is carried out by control packets CR, CC, CN and CA between the present conversion system and said X.25 apparatus, and the packets for X.32 protocol between the present conversion system and one of said networks including address conversion of a packet,
- data transfer is carried out by transferring a data packet through said direct path (53), and
- disconnect operation is carried out by control packets CQ, CF, and CI between the X.25 apparatus and the present conversion system, and the packets for X.32 protocol between the present conversion system and one of said networks.

2. A protocol conversion system (FIGS. 5, 6, and 7) coupled between a pair of networks selected from a telephone network, an ISDN network and a PBX network, comprising;
- a first signal identification portion (1) coupled with one of said networks,
- a second signal identification portion (6) coupled with the other network,
- a control packet identification portion (2) coupled between said signal identification portions (1,6),
- a pair of call process portions (12, 3) coupled with said control packet identification portion (2), and related signal identification portion (1, 6),
- an address table (4) and a packet edition portion (5) coupled with said control packet identification portion (2) and said signal identification portions (1, 6),
- an address table (4) and a packet edition portion (5) coupled with said control packet identification portion (2) and said signal identification portions (1, 6), and
- a common control (10) and a keypad (11) for common control and initialization of each of said elements,
- a direct path (53) coupling said signal identification portions (1, 6), wherein
- each of said signal identification portions (1, 6) separates received packets into data packets and control packets, said data packets being forwarded to another signal identification portion (6, 1) through said direct path (53), and said control packets being forwarded to said control packet identification portion (2),
- said call process portions (3, 12) process a dial signal for connection and disconnection, and
- said address table (4) and said packet edition portion process address conversion, and wherein
- connect operation is carried out by connecting one of said networks to the present conversion system, and next connecting the present invention system to the other network,
- data transfer is carried out by transferring a data packet between said signal identification portions (1, 6) through said direct path (53), and
- disconnect operation is carried out by disconnecting one of said networks from the present conversion system, and next disconnecting the present conversion system from the other network.

3. A protocol conversion system (FIG. 8) according to claim 1, wherein a pair of present conversion systems are coupled with a corresponding pair of X.25 apparatuses, and one network selected from a group of networks consisting of a telephone network, an ISDN network, and a PBX network is connected between said present conversion systems.

4. A protocol conversion system according to claim 1, wherein a data packet (DT) has a specific format which operates as a CQ packet.

* * * * *